G. F. BOWDLE & J. F. O'BRIEN.
SAND CUTTING AND RIDDLING MACHINE.
APPLICATION FILED SEPT. 29, 1911.

1,033,378.

Patented July 23, 1912.
6 SHEETS—SHEET 1.

G. F. BOWDLE & J. F. O'BRIEN.
SAND CUTTING AND RIDDLING MACHINE.
APPLICATION FILED SEPT. 29, 1911.

1,033,378.

Patented July 23, 1912.

6 SHEETS—SHEET 3.

Witnesses

Inventors
G. F. Bowdle.
J. F. O'Brien.
By
their Attorney

G. F. BOWDLE & J. F. O'BRIEN.
SAND CUTTING AND RIDDLING MACHINE.
APPLICATION FILED SEPT. 29, 1911.

1,033,378.

Patented July 23, 1912.

6 SHEETS—SHEET 4.

Inventors
G. F. Bowdle
J. F. O'Brien

Witnesses

By
Their Attorney

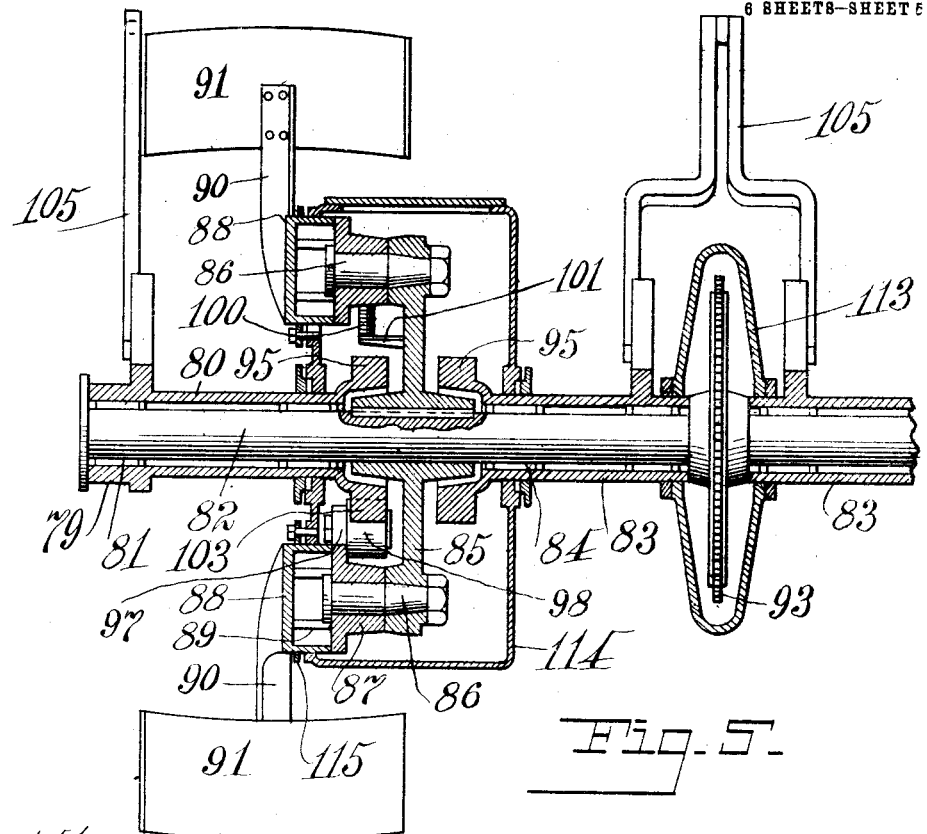
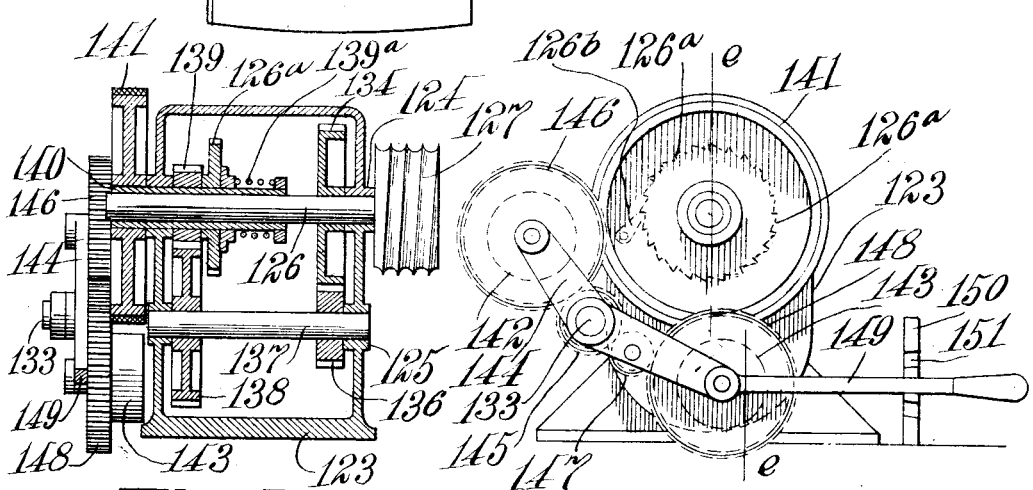

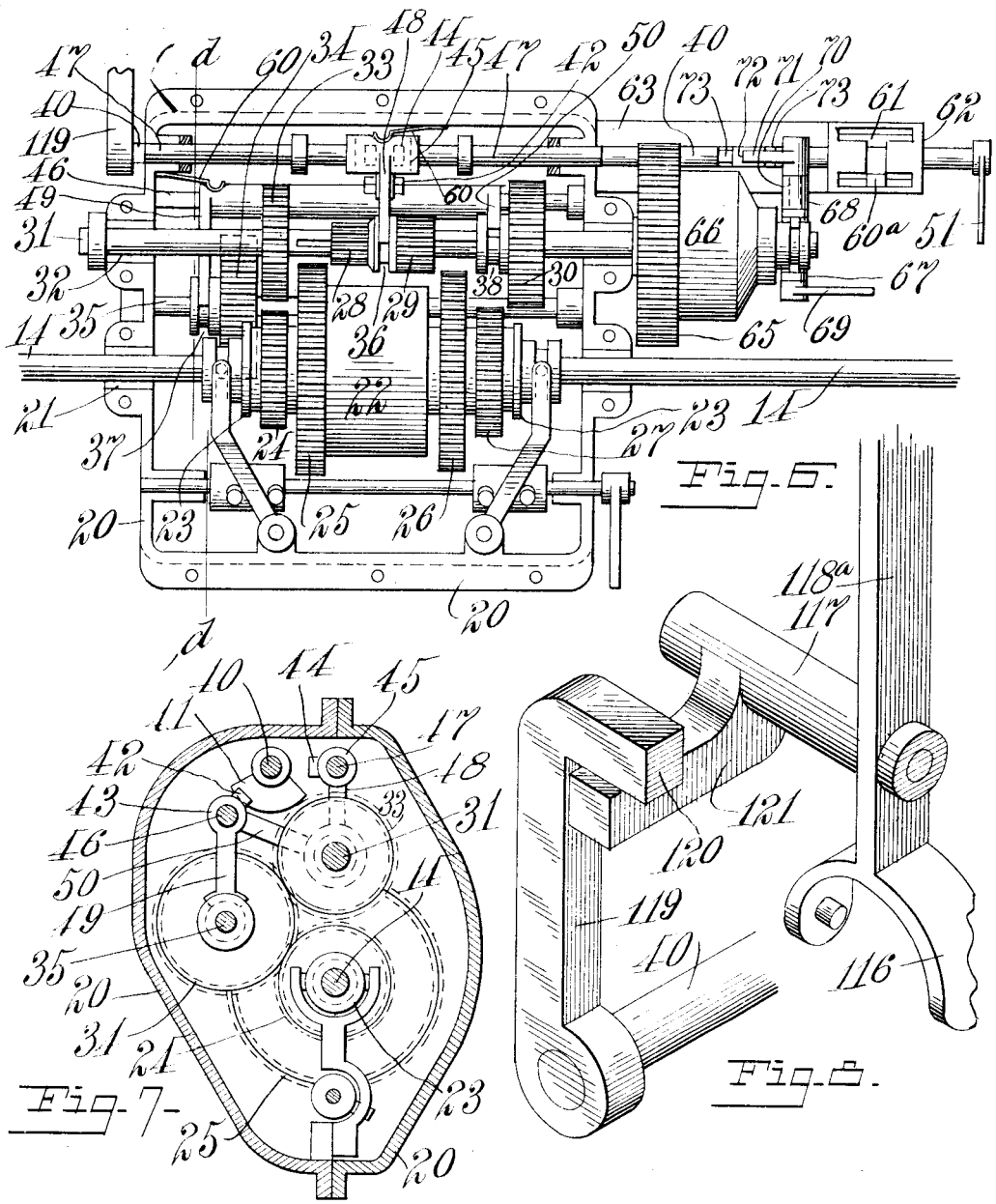

UNITED STATES PATENT OFFICE.

GEORGE F. BOWDLE AND JOHN F. O'BRIEN, OF PIQUA, OHIO.

SAND CUTTING AND RIDDLING MACHINE.

1,033,378.  Specification of Letters Patent.  Patented July 23, 1912.

Application filed September 29, 1911. Serial No. 651,890.

*To all whom it may concern:*

Be it known that we, GEORGE F. BOWDLE and JOHN F. O'BRIEN, citizens of the United States, residing at Piqua, in the county of Miami and State of Ohio, have invented certain new and useful Improvements in Sand Cutting and Riddling Machines; and we do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in sand cutting machines. Devices of this kind are made portable, and are adapted to be moved over the sand heaps in metal foundries to work the sand after it has been dumped from the flasks, thereby disintegrating the sand and reducing the same to a homogeneous mass. The machine, as it travels forward, engages the uncut sand at the front thereof and delivers the same in heaps at the rear.

One object of the invention is to provide a device of this type which riddles the sand in addition to cutting it, thereby removing the foreign particles and reducing the sand to a condition to be used in the molds without further preparation.

Another object of the invention is to provide means, whereby the height of the resultant heap of worked sand may be controlled.

Another object of the invention is to provide locking devices which prevent the machine cutting the sand when the said machine is traveling rearwardly or forward at a high speed.

Another object of the invention is to provide means for elevating the cutting members in a body.

The invention consists further, in certain details of construction and arrangement which will be more fully described in the specification and particularly pointed out in the claims.

Figure 1:
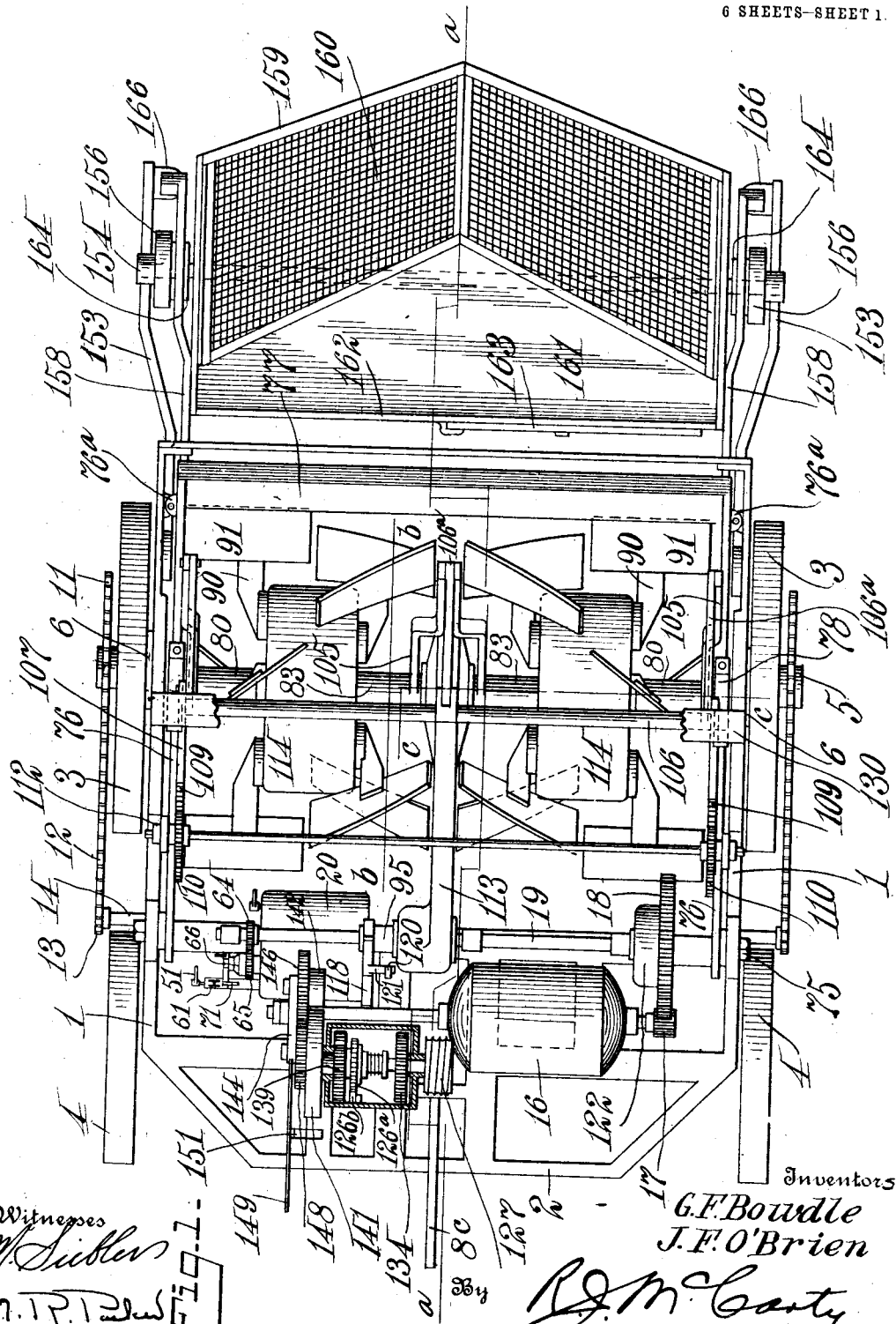
Figure 2:
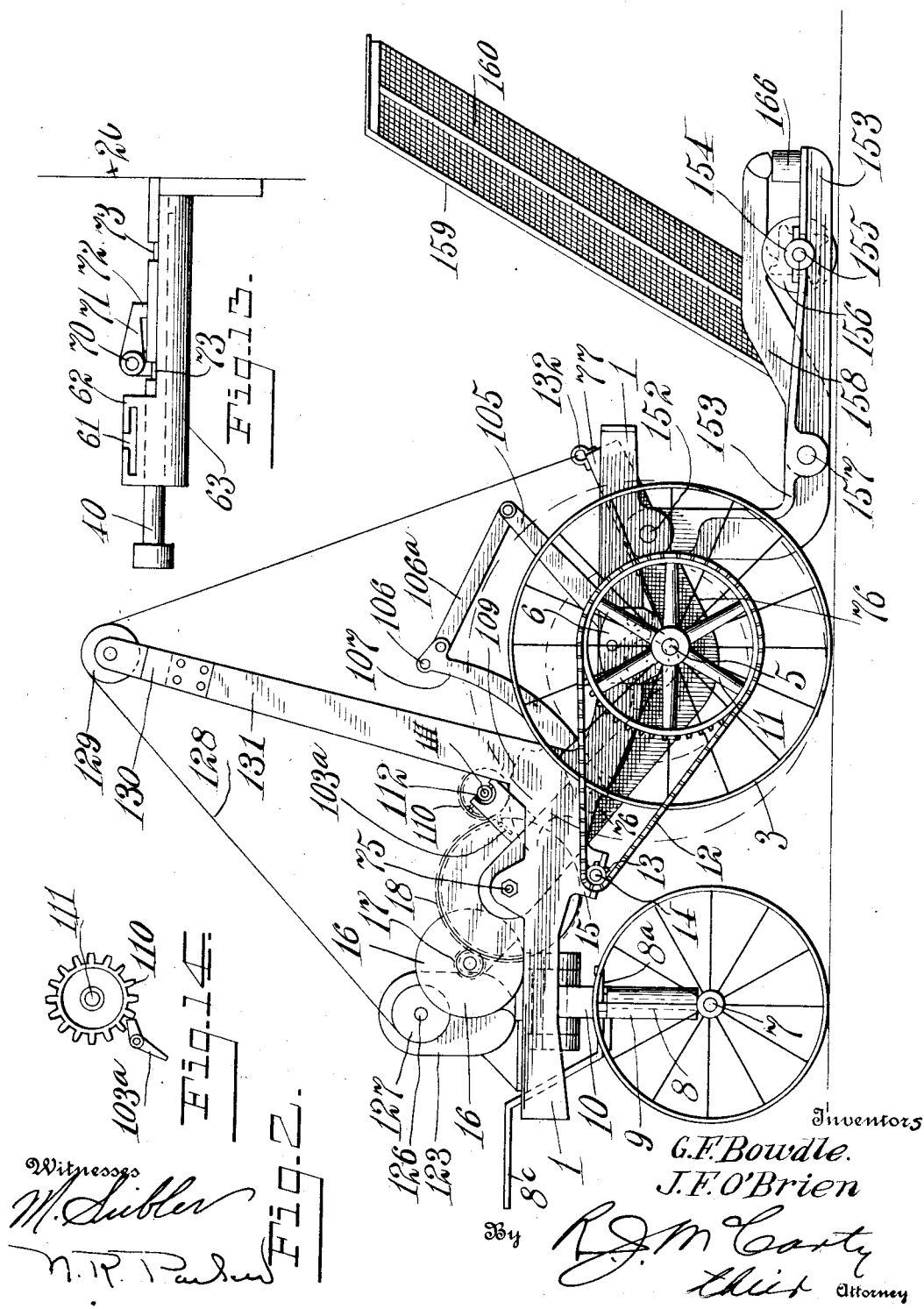
Figure 3:
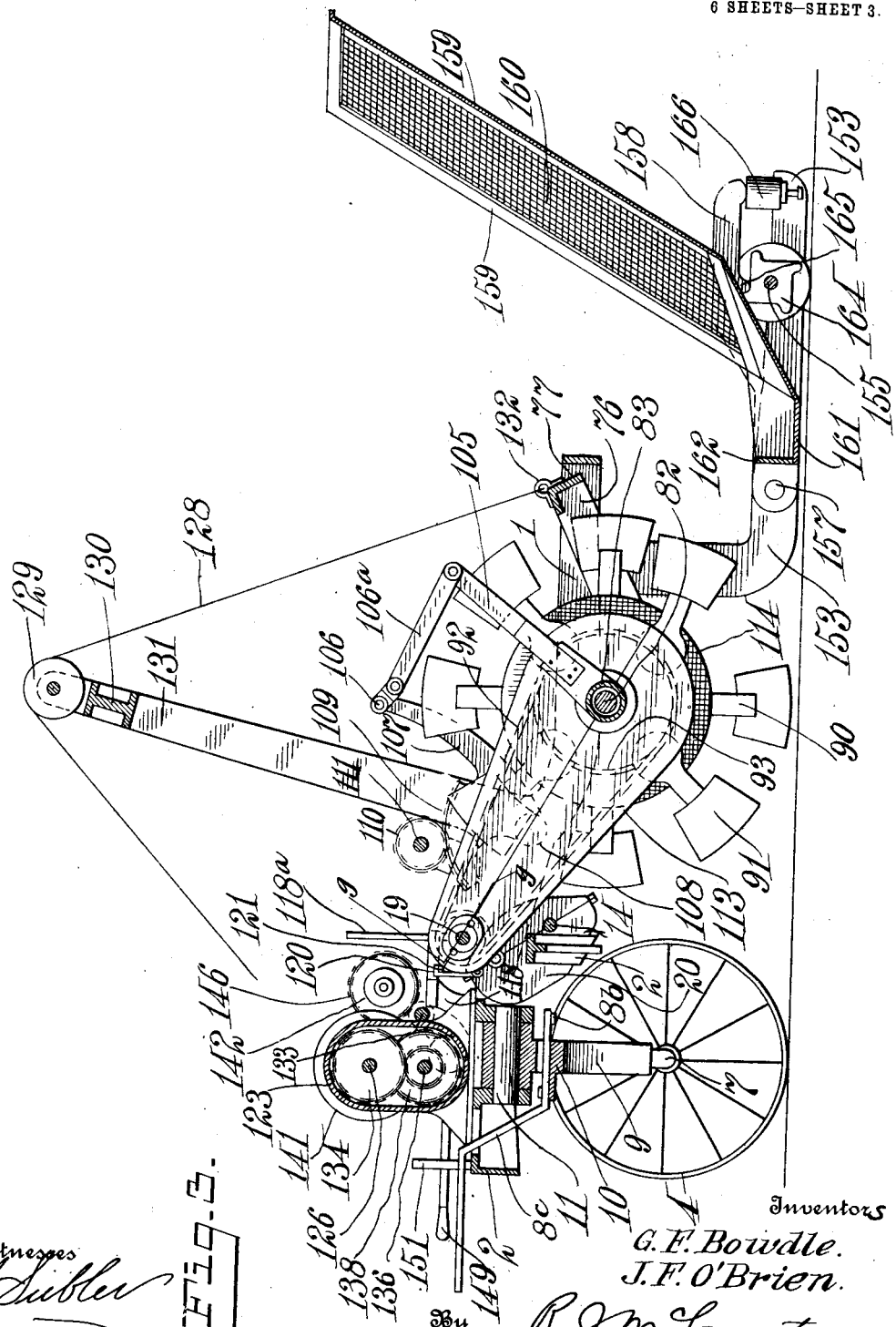
Figure 4:
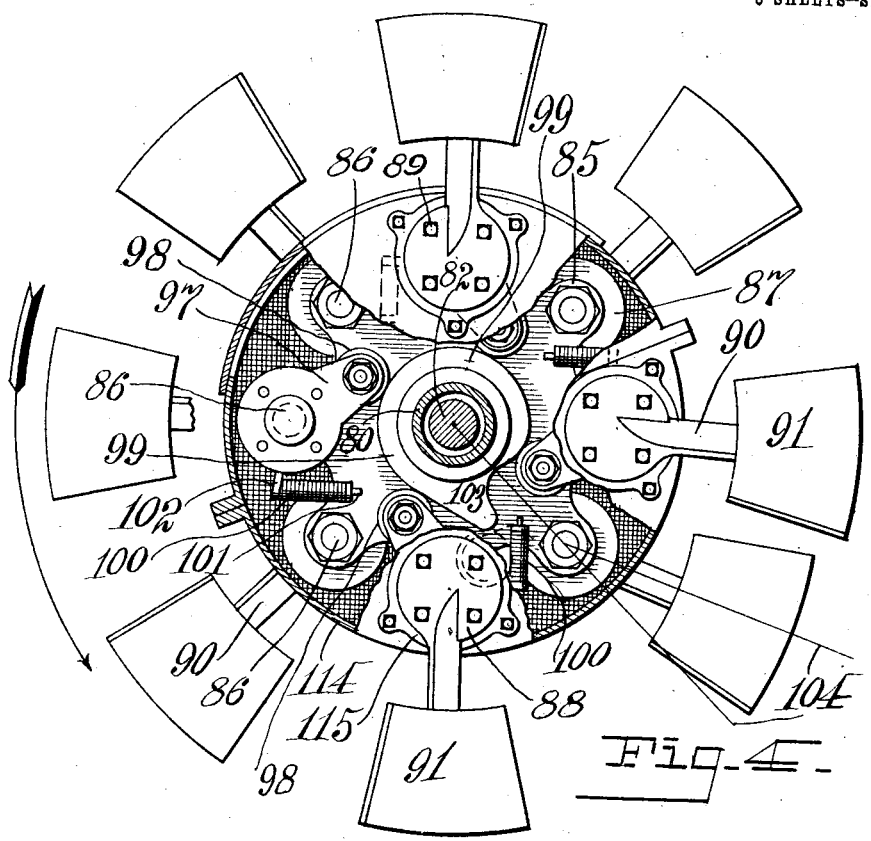
Figure 11:
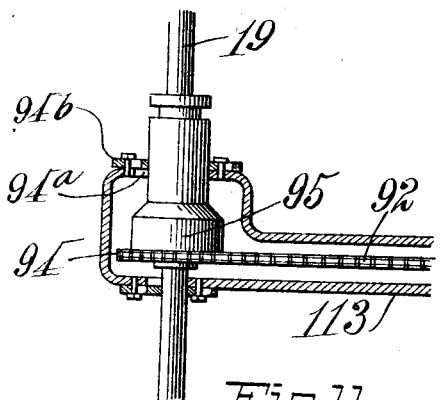
Figure 12:
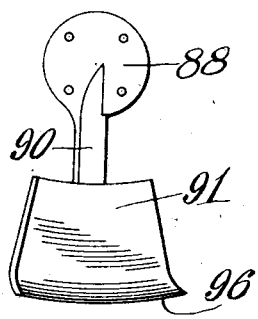

Referring to the accompanying drawings; Figure 1 is a top plan view of the machine; Fig. 2 is a side elevation thereof; Fig. 3 is a section on the line *a—a* of Fig. 1; Fig. 4 is a section on the line *b—b* of Fig. 1, with some of the parts broken away to show the cutting shovels on one side of the machine, and their actuating mechanism; Fig. 5 is a section on the line *c—c* of Fig. 1; Fig. 6 is a plan view of the differential gear with part of its casing removed; Fig. 7 is a section on the line *d—d* of Fig. 6; Fig. 8 is an enlarged perspective view of the locking mechanism which prevents the machine cutting sand when it is traveling rearwardly or forwardly at a high speed; Fig. 9 is a vertical sectional elevation of the elevating mechanism of the sand-cutting devices on the line *e—e* of Fig. 10; Fig. 10 is an end elevation of the same; Fig. 11 is a section on the line *g—g* of Fig. 3. Fig. 12 is a view of a modified form of the cutting shovels; Fig. 13 is a detail view of the means which prevents the clutch being set when the transmission gears are in incomplete mesh; and Fig. 14 is a detail view of the locking means for the cams which control the shovels.

Referring more particularly to the drawings, the main frame of the machine consists of side members 1 and cross members 2./ The main frame, thus constructed is supported on rear wheels or tractors 3, and front wheels 4 which are used to steer the machine. The rear wheels 3 are mounted on studs 5 attached to brackets 6 on the side frame members 1. The front wheels 4 are mounted in any well known manner, for example on studs 7 extending from vertical rock shafts 8 having bearings in the ends 9 of a yoke or bolster 10. See Figs. 2 and 3. The bolster 10 is provided with a longitudinal pivot 11 received by the main frame, and thus providing the main frame with a three point suspension, which permits the machine to travel over uneven surfaces. The upper ends of the shafts 8 are provided with cranks $8^a$ which are connected by a rod $8^b$. The rod $8^b$ is connected to a lever $8^c$ by which the wheels 4 are rocked to steer the machine.

*Propelling means.*—The tractors or rear wheels 3 are provided with sprockets 11 which are engaged by sprocket chains 12 which also engage driving sprockets 13 on the outer ends of a jack shaft 14. The jack shaft 14 is journaled in bearings 15, on the side members 1, and is driven from an electric motor 16, through gears 17 and 18, on shaft 19, and a transmission gear constructed as follows: Supported on the rear cross member 2 is a transmission gear housing 20 provided with bearings 21 which receive the jack shaft 14. Mounted on the shaft 14, within the housing 20, is a casing 22 provided with any well known form of differential gear. The said differential gear may be provided with locking members 23 which form no part of the present invention. Attached to the casing 22 is a reverse traveling gear 24, a low forward traveling gear 25, an intermediate forward traveling gear 26, and a high forward traveling gear 27. The gears 25, 26, 27, are adapted to be engaged by respective sliding gears 28, 29, 30 on a shaft 31 journaled in bearings 32 in the housing 20. The reverse gear 24 is adapted to be connected with a gear 33 on the shaft 31 by a sliding gear 34 on a shaft 35. The gears 28, and 29 are made integral, and are provided with a groove 36, while the gears 30 and 34 are provided with grooves 37 and 38 respectively. The sliding gears 28, 29, 30 and 34, are actuated to couple the shafts 14 and 31, and to drive the shaft 14 at varying speeds by the following device. Slidingly mounted in the housing 20 is a rock shaft 40 provided with a segment 41. The segment 41 is adapted to engage lugs 42 on a sleeve 43, when in one position, and lugs 44 on a sleeve 45 when in another position, as will be seen from Fig. 7. The sleeve 43 is mounted on a rod 46, while the sleeve 45 is mounted on a rod 47. The sleeve 45 is provided with an arm 48 which is received by the groove 36 of the gears 28 and 29. The sleeve 43 is provided with arms 49 and 50 which are received by the grooves 37 and 38 of the gears 34 and 30, respectively. The sliding rock shaft 40 is provided with a handle 51 by means of which it is actuated. When the shaft 40 is rocked to bring the segment 41 in engagement with the lugs 42 and is then shifted in one direction, the gear 34 will be placed in mesh with the gears 33 and 24 and the jack shaft 14 will be rotated to drive the machine rearwardly. When the shaft 40 is then shifted in the opposite direction, the gear 30 will be placed in mesh with the gear 27, and the jack shaft 14 will be rotated to drive the machine forwardly at a high speed. When the shaft 40 is then rocked to place the segment 41 in engagement with the lugs 44, and the shaft is then shifted in one direction, the gear 28 will be placed in mesh with the gear 25, and the jack shaft 14 will be rotated to drive the machine forward at a low speed. When the shaft 40 is then shifted in the opposite direction, the gear 29 will be placed in mesh with the gear 26 which will rotate the jack shaft 14 in a direction to move the machine forward at an intermediate speed. It will thus be seen that the jack shaft 14 has four distinct movements; three of which are forward movements and the other of which is a reversed movement to drive the machine rearwardly. To hold the gears 28, 29, 30 and 34 in a normal position, springs 60 are provided, which engage recesses in the respective sleeves 43 and 45. To guide the rock shaft 40 during its oscillating and reciprocating movements, said shaft is provided with a lug 60ª which rides in an H-shaped slot 61 in a member 62 supported in a bracket 63 extending from the housing 20. The shaft 31 is driven from the shaft 19 through a gear 64 mounted on the shaft 19, and a gear 65 freely mounted on the shaft 31. The gear 65 is connected with the shaft 31 by any well known type of clutch 66. The clutch 66 is actuated by an arm 67 mounted on a sleeve 68 provided with a handle 69. To prevent the clutch 66 being thrown in when the transmission gears are not fully in mesh, the sleeve 68 is connected, by means of a shaft 70, to an arm 71. The end 72 of the arm 71 is adapted to enter recesses 73 in the sliding rock shaft 40 when said shaft is at either end of its reciprocating movement. When the shaft 40 is incompletely shifted, the recesses 73 will be out of the path of the end 72, thereby preventing the clutch 66 being thrown in.

*Sand cutting devices or shovels*, (Figs. 4 and 5.)—The yoke 10 permits the sand heaps to pass under the forward portion of the machine, and as the machine travels forward, the sand at the rear end of the heap is engaged by a plurality of rotating shovels constructed, mounted and actuated as follows: Pivoted at 75 to the side members 1, are side members 76 of a frame which supports the shovels and which are connected by a bar 77 at their rear ends. The side members 76 are provided with bearings 78 which receive journals 79 of outer sleeves 80. The outer sleeves 80 are provided with bearings 81 which receive a shaft 82 extending across the width of the machine. The outer sleeves 80 surround the shaft 82, and also surrounding said shaft 82 are intermediate sleeves 83 similar to the sleeves 80. The sleeves 83 are provided with bearings 84, and are supported by the shaft 82. Keyed to the shaft 82 are right and left spiders 85, only one of which is shown but which are identical. The spiders 85 support pins 86 which extend from each side thereof. Mounted on the pins 86 are rocking members 87 to which cylindrical members 88 are attached by means of bolts 89. Extending from the cylindrical members 88 are arms 90 to which shovels 91 are attached. The shovels 91 are placed in four series, one series on each side of each spider. The shovels are staggered, and are placed at an angle, so that when they are at the lowermost point, the inner edges thereof will be toward the front of the machine. The shaft 82 and the shovels carried thereby are rotated from the shaft 19, by a sprocket chain 92 which passes around a sprocket 93 on the shaft 82 and a sprocket 94 on the shaft 19. The connection between the sprocket 94 and the shaft 19 is controlled by any well known type of clutch 95. The shovels 91 may be provided with curved edges 96 as is shown in Fig. 12 to more effectually cut and carry the sand. When said shovels are rotated and are moved toward the uncut sand heap, said shovels will cut the sand into small portions and will throw it to the rear of the machine, thereby disintegrating and reducing the sand to a pulverized, homogeneous mass. Owing to the inclination of the shovels, the uncut sand will be thrown toward the center, thereby forming the uncut sand in a heap in the shape of a prism which occupies a minimum amount of floor space. To more effectually disintegrate the sand when it is thrown by the shovels, said shovels are given an accelerated and a retarded movement, during the period of their revolution, when they are throwing the sand. This movement is accomplished by the following mechanism: The rocking members 87 are provided with arms 97 which carry rollers 98 in engagement with the periphery of cam disks 99 mounted on the sleeves 80 and 83. The said rollers are normally held in engagement with the disks 99 by springs 100 which engage projections 101 on the spiders 85 and extensions 102 on the rocking members 87. The springs 100 hold the shovels 91 in their normal position The disks 99 are provided with cams 103 which are engaged by the rollers 98 when the shovels are at or near their lowermost point. When the rollers 98 ride along the cams 103, the shovels will be given a movement in addition to their rotation, said additional movement being indicated by the lines 104 in Fig. 4. When the rollers reach the ends of the cams 103, the movement of the shovels 91 will be retarded which will permit the shovels to effectually toss the sand. The height of the resulting sand heap will be controlled by the point at which the shovels are accelerated. An early acceleration will throw the sand at a low angle with a resulting low sand heap, while a late acceleration will throw the sand at a greater angle with a resulting high sand heap. The point of acceleration of the shovels 91 is controlled by the position of the cams, and the position of the cams is controlled by rocking the sleeves 80 and 83 which are actuated as follows: The said sleeves 80 and 83 are provided with arms 105 which are connected to a cross bar by links 106ª. The bar 106 is mounted on the upper ends of levers 107 pivoted at 108 to the side members 76. The levers 107 are provided with gear portions 109 in mesh with pinions 110 mounted on a shaft 111 journaled in bearings 112 supported by the side members 76. The ends of the shaft 111 are squared and are thus adapted to receive a crank, (not shown). When the said shaft is rotated the levers 107 and the sleeves 80 and 83 will be oscillated and the positions of the cams 103 selected thereby The cams 103 are held in their set position by a pawl 103ª engaging one of the gears 110. The sprockets 93 and 94 and the chain 92 are incased within a housing 113 which protects said parts from the sand. The housing 113 is provided with elongated recesses 94ª which receive the shaft 19. The said recesses 94ª are closed by sliding plates 94ᵇ which permits the distance between the shafts 19 and 82 to be varied and the sprocket chain 92 to be adjusted. Also the spiders 85, and the cams 103 and the pivoted members 87 are inclosed within a housing 114 for the same reason. The cylindrical members 88 are surrounded by glands 115 which prevent dust and other foreign particles entering the housing 114. To prevent the shovels 91 being rotated when they have become obstructed, a connection between the shaft 19 and the gear 18 is effected by any well known type of slipping connection 122.

*Locking devices*, (Figs. 1–3–8–11.)—The clutch 95, through which the shovels are driven, is controlled by a bifurcated arm 116 mounted on a sleeve 117 journaled in a bracket 118, and provided with a handle 118ª. To prevent the shovels 91 being actuated when the machine is traveling rearwardly or forwardly at a high speed, the following locking device is provided. It will be remembered that the shaft 40 of the transmission gear, when in one position, is adapted to set the reverse and high speed gears, and when in its other position is adapted to set the low and intermediate gears. To lock the clutch 95 open, when the shaft 40 is in a position to set the high and reverse gears, the shaft 40 is provided with an arm 119, having an extension 120. The extension 120 is adapted to engage a projection 121 on the sleeve 117 when the clutch 95 is open and the shaft 40 is in a position to set the high and reverse gears. It will therefore, be seen that the shovels cannot be actuated when the machine is traveling at a high or a reverse speed. If the machine is traveling at a high or reverse speed, and it is attempted to throw in the clutch 95, the movement will be arrested by the projection 121 striking the extension 120 before the clutch is set.

*Means for elevating the shovels in a body,* (Figs. 9 and 10.)—Mounted on the forward part of the main frame of the machine, is a housing 123 provided with upper bearings 124, and lower bearings 125. Journaled in the upper bearings 124, is a shaft 126 provided with a drum 127. Attached to the drum 127, as will be seen from Fig. 2, is a cable 128 which passes over a sheave 129 mounted on a yoke 130 supported by arms 131 extending from the side members 1 of the main frame. The cable 128 is also attached to an eyelet 132 on the cross member 77 of the frame which carries the shovels. When the drum 127 is rotated in opposite directions the shovels will be elevated and lowered. The drum is actuated from the shaft 133 of the motor 16 through a reducing gear constructed as follows: Mounted on the shaft 126 and within the housing 123, is a gear 134 in mesh with a pinion 136 on a shaft 137 journaled in the bearings 125. Also mounted on the shaft 137 is a gear 138 in mesh with a pinion 139 mounted on a sleeve 140. The sleeve 140 is journaled on the shaft 126 and extends out through the casing 123 where it is provided with a friction wheel 141. The friction wheel 141 is adapted to be engaged by friction pinions 142 and 143 mounted on a lever 144 pivoted on the motor shaft 133. The pinion 142 is driven from the shaft 133 through a pinion 145 and a gear 146. The pinion 143 is driven from the pinion 145 through an idler 147 and a gear 148. The friction pinions 142 and 143, therefore, rotate in opposite directions. The lever 144 is provided with a handle 149 by means of which either one or the other of the friction pinions 142 or 143 may be placed in engagement with the friction wheel 141. The handle 149 is adapted to engage a member 150 provided with recesses 151 which receive the handle 149, and which holds the friction pinions in their various positions. When one of the pinions 142 or 143 is in engagement with the wheel 141, the drum 127 will be rotated to elevate the shovels, and when the other pinion is in mesh with the wheel 141 the drum will lower said shovels. The shovels are held in their elevated position by a pawl 126$^b$ engaging a ratchet 126$^a$ mounted on the sleeve 140. The ratchet 126$^a$ is pressed against the pinion 139 by a spring 139$^a$. The ratchet 126$^a$ rotates with the pinion 139 when the shovels are being elevated, but is held stationary by the pawl when said shovels are being lowered. The shovels are prevented from striking the ground when being lowered by projections 76$^a$ on the side members 1 and 76.

*Riddling device.*—When it is desired to riddle the sand in addition to cutting it, the following device is attached at the rear of the machine. The side members 1 of the main frame are provided with pins 152 which are united to the upper ends of L shaped side members 153. These side members are provided with bearings 154 which receive a shaft 155 provided with wheels 156 which carry said frames 153. Pivoted to the said frames 153 at 157 are rocking members 158 which support a frame 159 provided with a screen 160. The sand is thrown through the screen 160 by the shovels 91, thereby effectually riddling the same. The said screen is formed of right and left portions which are placed at an angle to effectually deposit the riddled sand in a prismatic heap. The frame 159 is provided with a pan 161 at its lowermost portion which receives the castings, gates, sprues or other foreign articles that may be in the sand and which cannot pass through the screen. The pan 161 is placed at an angle, and is provided with a door 162 secured by a latch 163 and through which the foreign objects are discharged. The screen of the riddle is agitated by cams 164 on the wheels 156, which cams engage projections 165, on the side members 158. The screen 160 is elevated by the cams 164 and is depressed by gravity thereby agitating said screen. The downward movement of the screen is arrested by bumpers 166 which may be of any well known type. The shovels during the period in which their rollers are riding over the highest surfaces of the cams pick up the sand and carry it through a gradually accelerated movement which ends with the highest points of the cams, just in advance of the depressed portions of said cams. When the rollers ride into said depressions in the cams the retarding movement is given the shovels and the sand is delivered therefrom in a manner similar to hand shoveling. The retarding movement prevents the shovels from interfering with the sand after it is delivered from the shovels. The sand thus cannot be carried over as in the case of any sand cutting machine depending only on centrifugal force in forming high heaps of sand.

Without desiring to limit ourselves to any detail of construction or arrangement of parts shown and described and which may be varied within the scope of the claims, we claim:

1. In a device of the character specified, a plurality of shovels rotatable in a body through a body of sand, and means for imparting to said shovels a gradually accelerated movement during which they pick up the sand, and a retarding movement during which the sand is delivered from said shovels.

2. In a sand cutting machine, the combination with a plurality of shovels, means for rotating said shovels in a body, and means for imparting to said shovels a gradually accelerated movement through a body of sand, and a retarding movement during which the sand is delivered from said shovels.

3. In a device of the type specified, a portable frame adapted to travel over a sand heap, sand-cutting members mounted on said frame, and adapted to engage the sand and to throw the same rearwardly, as the portable frame travels forwardly, and a screen mounted in an upright position at the rear of the said frame and adapted to receive and riddle the sand thrown rearwardly by the cutting members.

4. In a device of the type specified, a portable frame adapted to travel over a sand heap, sand-cutting members mounted on said frame and adapted to engage the sand, means for imparting to said cutting members a rearwardly accelerated movement and a retarding movement during which sand is collected by said shovels and pitched rearwardly as the frame travels forwardly, and a screen adapted to receive the sand thrown by the cutting members.

5. In a device of the type specified, a portable frame adapted to travel over a sand heap, sand-cutting members mounted on said frame and adapted to engage the sand and to throw the same rearwardly, as the frame travels forwardly, and a screen mounted at the rear of said frame and adapted to receive and riddle the sand thrown by the cutting members, the right and left portions of said screen being placed at an angle, whereby the sand is deposited in a prismatic heap.

6. In a device of the type specified, the combination with a frame adapted to travel over a heap of sand, and wheels upon which said frame is mounted, of sand-cutting members mounted on said frame and adapted to engage the sand, means controlling the movement of said cutting members to throw the sand rearwardly, a screen mounted to receive and riddle the sand thrown by the cutting members, the right and left portions of said screen being placed at an angle, whereby the sand is deposited in a prismatic heap, and means for agitating said screen.

7. In a device of the type specified, the combination with a frame adapted to travel over a bed of sand, and wheels upon which said frame is mounted, of sand-shoveling members mounted on said frame and adapted to engage the sand, to throw the sand rearwardly, an auxiliary frame mounted in the rear of said first named frame, a screen pivotally mounted on said auxiliary frame in an upright position, and cams adapted to agitate said screen.

8. In a device of the type specified, a plurality of rotating cutting members, means for rotating said cutting members, and a cam for accelerating the movement of said cutting members during a portion of their revolution, and for checking said accelerated movement.

9. In a device of the type specified, a frame, wheels upon which said frame is mounted, a plurality of shovels mounted on said frame, means for rotating said shovels, a cam adapted to accelerate the movement of said shovels during one portion of their revolution, and to check said accelerating movement to deliver the sand from said shovels.

10. In a device of the type specified, a portable frame, a plurality of cutting members mounted on said frame, means for rotating said cutting members, a cam controlling said cutting members and adapted to accelerate the movement of said cutting members during a portion of their revolution, and means for adjusting the position of said cam.

11. In a device of the type specified, a portable frame, a shaft mounted on said frame, means for rotating said shaft, a spider mounted on said shaft, a plurality of sand-cutting members pivotally mounted on said spider, a cam actuating said cutting members on said pivots, and imparting thereto an accelerated movement and a retarding movement.

12. In a device of the type specified, a portable frame, a shaft journaled on said frame, means for rotating said shaft, a plurality of sand-cutting shovels pivotally supported and carried around by said shaft, a cam controlling said sand-cutting shovels, and imparting thereto a reciprocating movement during their revolution, and means for adjusting the position of said cam.

13. In a machine of the character specified, a portable frame, a plurality of shovels carried by said frame, means for rotating said shovels in a body through a body of sand, means for giving said shovels a gradually accelerated movement to collect the sand, and a retarding movement to deliver the sand collected, and a screen mounted adjacent to said shovels to receive the sand therefrom.

14. In a device of the type specified, a portable frame, a shaft journaled in said frame, means for rotating said shaft, a spider mounted on said shaft, a plurality of sand-cutting members pivotally mounted on said spider, cams controlling said cutting members, and imparting to them an accelerated and retarded movement, and levers controlling the position of said cam.

15. In a device of the type specified, a portable frame, a shaft journaled in said frame, means for rotating said shaft, a plurality of pivotal sand-cutting members revoluble about a common axis, a cam imparting to said cutting members reciprocating movement, a sleeve attached to said cam and mounted on said shaft, levers connected to said sleeve, and adapted to shift said cam, and gears adapted to actuate said levers.

16. In a device of the type specified, a portable frame, wheels upon which said frame is mounted, transmission gearing through which said wheels are driven, means for setting said transmission gearing, cutting members mounted on said frame, means for actuating said cutting members, and locking devices mounted between said setting means and said actuating means.

17. In a device of the type specified, a frame, wheels upon which said frame is mounted, means for driving said wheels, transmission gearing through which said wheels are driven, means for setting said transmission gearing, cutting members mounted on said frame, means for actuating said cutting members, a clutch controlling said actuating means, and locking devices mounted between said setting means and said clutch.

18. In a machine of the type specified, the combination with a drum, and means for rotating said drum, of a plurality of shovels pivotally mounted on said drum, and adapted to be rotated through a body of sand, and a cam engaged by the ends of said shovels to impart an accelerated movement to said shovels as they are carried through the sand and to cause a delivery of the sand from said shovels.

In testimony whereof, we affix our signatures, in the presence of two witnesses.

GEORGE F. BOWDLE.
JOHN F. O'BRIEN.

Witnesses:
FRANCES B. BOWDLE,
MARIE BOWDLE.